John A. Frey's Improvement in Lamp Burners.
No. 73710
PATENTED
JAN 28 1868
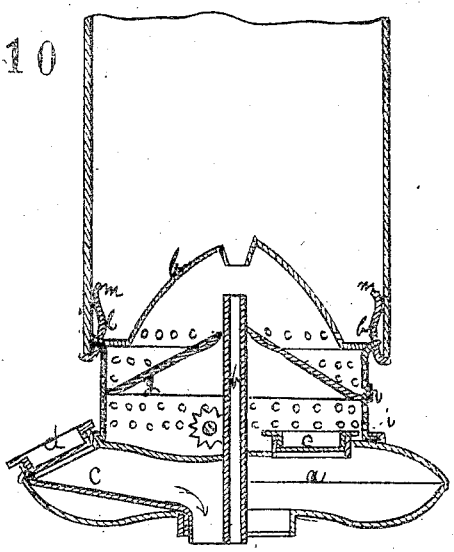
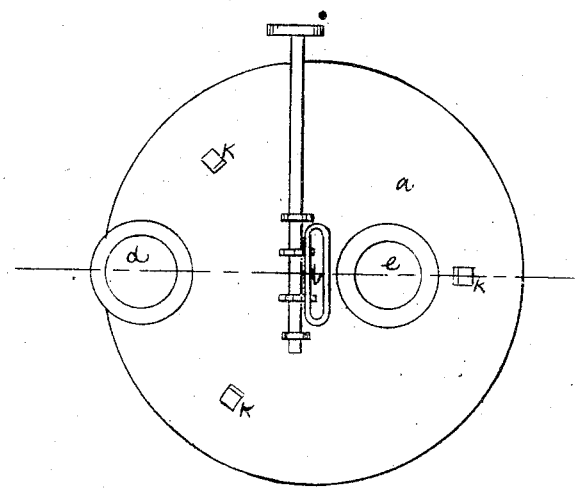
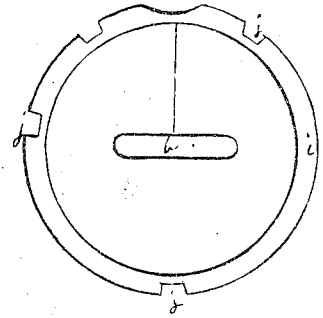
Witnesses.
T. Smith
L. C. Jones
Inventor
John A. Frey
by Atty. T. T. Everett

United States Patent Office.

JOHN A. FREY, OF WASHINGTON, DISTRICT OF COLUMBIA.

Letters Patent No. 73,710, dated January 28, 1868.

---

IMPROVEMENT IN LAMPS.

---

The Schedule referred to in these Letters Patent and making part of the same.

---

TO ALL WHOM IT MAY CONCERN:

Be it known that I, JOHN A. FREY, of the city of Washington, in the District of Columbia, have invented a certain new and useful Improvement on Lamp-Burners; and I do hereby declare that the following is a full, clear, and exact description of the same, reference being had to the accompanying drawings, and to the letters and marks thereon, which said drawings form part of this specification, and represent a burner having my improvement as a part thereof.

Figure 1 of these drawings is a view by vertical section.

Figure 2, a top view of the base of the burner, the cones being off; and

Figure 3 is a view of the bottom of the cones.

In each of these figures like marks and letters are used to indicate like parts.

A leading object of my invention is to prevent the explosion of the lamp by the communicating of heat from the flame of the wick to the lamp and the oil within it, and this I effect by having the base of the burner a receptacle or reservoir for water or some non-conducting or slowly-conducting element or material.

This receptacle $a$ is made up of two plates, swaged to the proper form, and their edges secured and made tight, with the wick-tube $b$ and oil-filling tube $c$ attached thereto. A screw-cap, $d$, covers the filling-tube, and a like cap, $e$, the opening for filling the receptacle with water. The filling-tube $c$ can be reached without taking off the cones or chimney, so that the lamp may be filled or replenished when lit with perfect safety, and it will only be necessary to detach the cones and chimney when required to fill the receptacle or clean out the burner. The upper portion of the burner is made up of two cones $f$ and $g$, with perforated band $h$ and flange $i$. This upper portion is attached to the lower part or receptacle by means of the notches $j$ and catches $k$. To the top of the perforated plate are affixed springs $l$, which are turned outward at the bottom, for the resting of the edge of the chimney, while the deflecting top part $m$ will press against the inner surface of the chimney with sufficient force to hold it in place. The upper part of the interior cone, where the wick-tube has passage, and at the side of the wick-tube, is depressed, as is shown by fig. 1, the object of this depression being to prevent the current of air passing too freely and strong to the centre of the flame. The inner cone $g$ starts just above the second row of the perforations, as is shown by fig. 1, and extends within about an eighth of an inch of the top of the wick-tube, giving it free accession of air, consuming the oil, preventing odor, and making perfect combustion.

What I claim as my invention, and desire to secure by Letters Patent, is—

1. The water-chamber making a part of the burner, when provided with an oil-feeding duct, and a water-feeding duct, with the wick-tube passing through the same, and nearly or entirely surrounded by water, arranged and combined substantially as described.

2. The deflection in the top of the cone $g$, as and for the purpose set forth.

The above specification of my invention signed by me, this 17th day of December, 1867.

JOHN A. FREY.

Witnesses:
WM. F. MCNAMARA,
JAMES T. GRAHAM.